United States Patent
Stras et al.

(10) Patent No.: US 11,274,716 B2
(45) Date of Patent: Mar. 15, 2022

(54) BRAKING SYSTEM FOR AN AIRCRAFT WHEEL

(71) Applicant: Goodrich Corporation, Charlotte, NC (US)

(72) Inventors: Karol Stras, Jelenia Gora (PL); Adam Wyszowski, Wroclaw (PL); Pawel Pacak, Wroclaw (PL)

(73) Assignee: Goodrich Corporation, Charlotte, NC (US)

(*) Notice: Subject to any disclaimer, the term of this patent is extended or adjusted under 35 U.S.C. 154(b) by 19 days.

(21) Appl. No.: 16/711,188

(22) Filed: Dec. 11, 2019

(65) Prior Publication Data
US 2020/0400204 A1  Dec. 24, 2020

(30) Foreign Application Priority Data
Jun. 21, 2019  (EP) ..................... 19461545

(51) Int. Cl.
  *F16D 65/84* (2006.01)
  *F16D 55/36* (2006.01)
  *F16D 65/78* (2006.01)
(52) U.S. Cl.
  CPC ............. *F16D 65/84* (2013.01); *F16D 55/36* (2013.01); *F16D 2065/785* (2013.01)
(58) Field of Classification Search
  CPC ...... F16D 55/36; F16D 65/853; F16D 65/847; F16D 2065/785; F16D 2065/1328; F16D 65/128; F16D 2055/0037; F16D 2065/1332; F16D 65/78
  See application file for complete search history.

(56) References Cited

U.S. PATENT DOCUMENTS

| | | | |
|---|---|---|---|
| 3,051,528 A | * | 8/1962 | Rogers .................... B60C 23/18 301/6.3 |
| 3,958,833 A | | 5/1976 | Stanton |
| 3,972,395 A | * | 8/1976 | Jannasch ................. F16D 55/40 188/251 A |

(Continued)

FOREIGN PATENT DOCUMENTS

| | | |
|---|---|---|
| DE | 2505177 A1 | 8/1975 |
| FR | 2212007 A5 | 7/1974 |

(Continued)

OTHER PUBLICATIONS

European Patent Office, European Search Report dated Dec. 12, 2019 in Application No. 19461545.6.

*Primary Examiner* — Robert A. Siconolfi
*Assistant Examiner* — Mahbubur Rashid
(74) *Attorney, Agent, or Firm* — Snell & Wilmer L.L.P.

(57) ABSTRACT

A braking system (4) for an aircraft wheel (2) comprises first and second brake rotor discs (20a, 20b) axially spaced along an axis (A) and rotationally coupled to the wheel (2), a stator disc (24) arranged axially between the first and second rotor discs (20a, 20b), and a heat shield (34) mounted to at least one of the first and second rotor discs (20a, 20b). Radially outer portions (30) of the first and second rotor discs (20a, 20b) extend radially outwardly of the stator disc (24) to define a gap (32) between the radially outer portions (30) of the first and second rotor discs (20a, 20b). The heat shield (34) extends at least partially over or into the gap (32).

12 Claims, 13 Drawing Sheets

(56) References Cited

U.S. PATENT DOCUMENTS

| | | | | |
|---|---|---|---|---|
| 4,007,814 | A | * | 2/1977 | Berger .................. F16D 65/126 188/218 XL |
| 4,017,123 | A | * | 4/1977 | Horner .................... B60C 23/18 301/6.91 |
| 4,084,857 | A | | 4/1978 | VanderVeen |
| 4,249,642 | A | * | 2/1981 | Anderson ............... F16D 55/40 188/218 XL |
| 4,511,021 | A | * | 4/1985 | Grider .................. F16D 65/126 188/218 XL |
| 4,703,837 | A | * | 11/1987 | Guichard ................ B60T 1/065 188/264 G |
| 4,784,246 | A | * | 11/1988 | Edmisten ............. F16D 65/126 188/218 XL |
| 4,856,619 | A | | 8/1989 | Petersen |
| 4,890,700 | A | * | 1/1990 | Guichard ............. F16D 65/126 188/218 XL |
| 5,002,342 | A | * | 3/1991 | Dyko ...................... B60C 23/18 188/264 G |
| 5,236,249 | A | * | 8/1993 | Han ........................ B60C 23/18 301/6.1 |
| 5,310,025 | A | * | 5/1994 | Anderson ............... F16D 55/36 188/73.37 |
| 5,503,254 | A | * | 4/1996 | Fisher .................... F16D 55/36 188/218 XL |
| 5,560,452 | A | * | 10/1996 | Labougle ............. F16D 65/126 188/218 XL |
| 5,851,056 | A | * | 12/1998 | Hyde ...................... B60B 19/10 301/6.91 |
| 6,419,056 | B1 | * | 7/2002 | Dyko ..................... B64C 25/36 188/264 A |
| 6,514,041 | B1 | * | 2/2003 | Matheny ................ F01D 11/18 415/177 |
| 6,712,184 | B2 | * | 3/2004 | Thorpe ................... F16D 65/12 188/218 XL |
| 7,051,845 | B2 | * | 5/2006 | Thorp .................... F16D 55/36 188/71.6 |
| 7,303,055 | B2 | * | 12/2007 | Eckert .................... F16D 55/36 188/18 A |
| 7,802,758 | B2 | * | 9/2010 | Cress ..................... F16D 55/36 244/103 R |
| 8,776,955 | B2 | * | 7/2014 | Hakon .................. F16D 65/853 188/71.5 |
| 9,103,393 | B2 | * | 8/2015 | Houser ................... F28F 13/00 |
| 9,541,145 | B2 | * | 1/2017 | Kirkpatrick ........... F16D 65/127 |
| 9,718,317 | B2 | * | 8/2017 | Kendricks ............. B60B 25/004 |
| 9,903,671 | B2 | | 2/2018 | Houser et al. |
| 9,908,375 | B2 | * | 3/2018 | Baden .................... F16D 65/847 |
| 10,100,670 | B2 | * | 10/2018 | Leslie .................... F01D 25/08 |
| 2008/0181778 | A1 | * | 7/2008 | Staempfli ................. F01D 5/08 416/204 R |
| 2016/0279710 | A1 | * | 9/2016 | Whittle .................. B22F 10/00 |
| 2018/0031062 | A1 | | 2/2018 | Remond et al. |
| 2018/0128331 | A1 | * | 5/2018 | Stevenson ............... F16D 55/40 |
| 2019/0120304 | A1 | | 4/2019 | Laget et al. |

FOREIGN PATENT DOCUMENTS

| | | |
|---|---|---|
| GB | 2284027 A | 5/1995 |
| WO | 2008097386 A2 | 8/2008 |

* cited by examiner

BRAKING SYSTEM FOR AN AIRCRAFT WHEEL

CROSS-REFERENCE TO RELATED APPLICATIONS

This application claims priority to European Patent Application Serial No. 19461545.6 filed on Jun. 21, 2019, entitled "BRAKING SYSTEM FOR AN AIRCRAFT WHEEL." The content the foregoing application is hereby incorporated by reference for all purposes.

FIELD

The present disclosure relates to braking systems for aircraft wheels, and in particular to heat shielding of braking systems.

BACKGROUND

Aircraft wheel braking systems dissipate kinetic energy as heat during braking. This is typically achieved by frictional contact between adjacent stationary and rotating brake discs, the rotating brake discs being mounted to rotate with a rotating aircraft wheel. During braking, the brake discs heat up rapidly. It is important for the tyre of the wheel to be shielded from the hot brake discs, as exposure to excessive heat could lead to failure.

Aircraft braking systems must meet certain standards to achieve certification. Two widely used standards are high energy stop and fuse plug normal stop. Aircraft wheel and brake designers seek to optimise braking system design while meeting the requirements of these standards.

It is therefore desirable to provide an aircraft braking system with improved heat shielding to improve wheel and brake thermal performance.

SUMMARY

In accordance with a first aspect of the present disclosure, there is provided a braking system for an aircraft wheel. The braking system comprises first and second brake rotor discs axially spaced along an axis and rotationally coupled to the wheel, a stator disc arranged axially between the first and second rotor discs, and a heat shield mounted to at least one of the first and second rotor discs. Radially outer portions of the first and second rotor discs extend radially outwardly of the stator disc to define a gap between the radially outer portions of the first and second rotor discs. The heat shield extends at least partially over or into the gap.

In embodiments of the disclosure, the heat shield may comprise a first heat shield mounted to the first rotor disc and a second heat shield mounted to the second rotor disc, the first heat shield and the second heat shield both extending at least partially over or into the gap.

In embodiments of the disclosure, the first and/or second heat shields may comprise at least one axially extending fin. The first heat shield may comprise one, two, three, or four fins. The second heat shield may comprise one, two, three, or four fins.

In embodiments of the disclosure, the fins may have a curved profile that is substantially concentric with the rotor disc axis.

In embodiments of the disclosure, the first and second heat shields may be configured and arranged such that they will not come into contact during use of the braking system as the rotor discs and/or stator disc wear.

In certain embodiments, respective fins of the first and second heat shields may be arranged at different radial distances from the axis such that the fins may overlap axially during use of the braking system as the rotor discs and stator disc wear.

In alternative arrangements, respective fins of the first and second heat shields may be arranged at substantially the same radial distance but have an axial length such that the fins will not contact each other during use of the braking system as the rotor discs and stator disc wear.

In embodiments of the disclosure, the radially outer portions of the first and second rotor discs may each comprise a plurality of axially extending slots. The slots may be adapted to receive torque bars for coupling the first and second rotor discs to the wheel. The circumferential side surfaces of the slots may receive rotor clips mounted to the rotor discs and adapted to protect the side surfaces of the slots. The heat shield(s) may be mounted to or integrally formed with the rotor clips.

In embodiments of the disclosure, each rotor clip may comprise a body adapted to mount to a radially outer portion of the first and/or second brake rotor disc. The body may have a base and first and second sides extending substantially parallel to each other from opposite ends of the base. The heat shield may be mounted to or integrally formed with the body. The heat shield may comprise at least one first fin extending substantially orthogonally from the first side of the body.

In accordance with a second aspect of the present disclosure, there is provided a rotor clip for an aircraft wheel braking system. The rotor clip comprises a body adapted to mount to a radially outer portion of a brake rotor disc and a heat shield mounted to or integrally formed with the body. The body has a base and first and second sides extending substantially parallel to each other from opposite ends of the base. The heat shield comprises at least one first fin extending substantially orthogonally from the first side of the body.

In embodiments of the disclosure, the fin(s) may have a curved profile.

In embodiments of the disclosure, the rotor clip may comprise a plurality of first fins extending from the first side of the body. For example, the rotor clip may comprise two or three first fins.

In embodiments of the disclosure, the braking system according to the first aspect or the rotor clip according to the second aspect may further comprise at least one second fin extending substantially orthogonally from the second side of the body and extending in an opposite direction to the at least one first fin. In an embodiment, the braking system according to the first aspect or the rotor clip according to the second aspect may comprise a plurality of second fins, for example two or three second fins.

In certain embodiments, the first fin(s) and the second fin(s) may be arranged at different distances from the base. In alternative embodiments, at least one first fin and a or the at least one second fin may be arranged at substantially the same distance from the base.

In accordance with a third aspect of the present disclosure, there is provided a method of reducing heat transfer from a brake disc stack to a wheel. The method comprises positioning a heat shield in a gap formed between the radially outer portions of adjacent rotor discs in the stack.

BRIEF DESCRIPTION OF THE DRAWINGS

Some embodiments of the disclosure will now be described by way of example with reference to the accompanying drawings in which.

DETAILED DESCRIPTION

Figure 1:
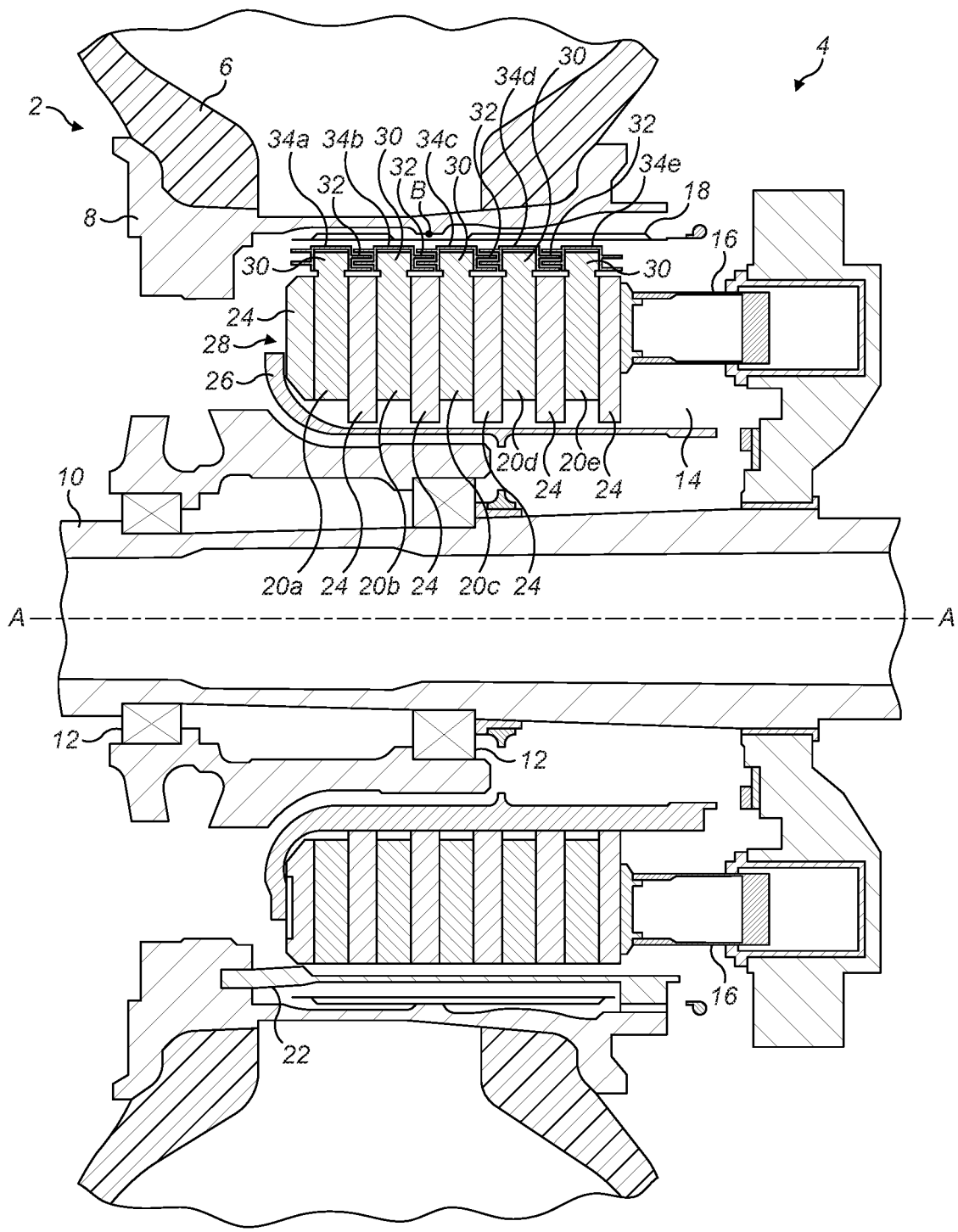
FIG. 1 shows a cross-sectional view of an aircraft wheel and a braking system.

FIG. 1 shows an aircraft wheel 2 and a braking system 4. The wheel 2 comprises a tyre 6 mounted to a wheel rim 8. The wheel 2 rotates about an axle 10 via bearings 12. The wheel rim 8 defines a cavity 14 for receiving the braking system 4. The braking system 4 is actuated by one or more pistons 16 mounted to the axle 10 in any suitable manner, as is known in the art.

A primary heat shield 18 of conventional design is positioned between the braking system 4 and the wheel 2 to absorb heat generated in the braking system 4 during braking and reduce the amount of heat passing into the wheel rim 8 and tyre 6. Due to the restricted space between the braking system 4 and the wheel rim 8, it is difficult to modify the primary heat shield 18 to improve thermal performance of the braking system 4.

The braking system 4 has a plurality of brake rotor discs 20a-20e axially spaced along an axis A-A and rotationally coupled to the wheel 2. In the embodiment shown, the braking system 4 has five rotor discs 20a-20e. In other embodiments, the braking system 4 may have any suitable number of rotor discs. For example, the braking system may have two, three, four, six, or seven rotor discs.

The brake rotor discs 20a-20e are rotationally coupled to the wheel rim 8 via torque bars 22 such that the rotor discs 20a-20e rotate with the wheel 2, but so as to be movable axially relative thereto.

A respective stator disc 24 is arranged axially between each adjacent pair of rotor discs 20a-20e. Stator discs 24 are also arranged axially at either end of the rotor discs 20a-20e. In the embodiment shown, the braking system 4 has six stator discs 24. The stator discs 24 are arranged between the first and second rotor discs 20a, 20b, the second and third rotor discs 20b, 20c, the third and fourth rotor discs 20c, 20d, and the fourth and fifth rotor discs 20d, 20e, and at an outer face of the first rotor disc 20a and the last rotor disc 20e. In other embodiments, the braking system 4 may have any suitable number of stator discs 24. For example, the braking system 4 may have one, two, three, four, five, or seven stator discs 24. In an embodiment where the braking system 4 has one rotor disc 20a, the braking system 4 may have double stator discs 24.

The stator discs 24 are coupled to the axle 10 via a torque tube 26 or other suitable means such that the stator discs 24 do not rotate relative to the axle 10, and also do not rotate relative to the rotor discs 20a-20e. The stator discs 24 are, however, moveable axially relative to the axle 10.

The rotor discs 20a-20e and stator discs 24 together form a brake disc stack 28. The rotor discs 20a-20e and/or the stator discs 24 may be made from a carbon material or other suitable brake pad material that wears during use of the braking system 4. The rotor discs 20 and the stator discs 24 may be made from the same or different materials and/or wear at the same or different rates.

In use, the piston 16 is moved axially under hydraulic pressure of other means to press the rotor discs 20 and stator discs 24 into frictional engagement. As the discs 20, 24 wear, they will become thinner. As such, the axial spacing between the rotor discs 20 will decrease, and the overall axial length of the stack 28 will decrease.

Radially outer portions 30 of the rotor discs 20a-20e extend radially outwardly of the stator discs 24 to define an axial gap 32 between the radially outer portions 30 of adjacent rotor discs 20a-20e. As will be discussed further below, in accordance with the disclosure a heat shield 34 is mounted to at least one of the rotor discs 20a-20e and extends at least partially over and/or into the gap 32.

Various configurations of the braking system 4 will now be described with reference to FIGS. 2 to 9. Although the braking system 4 is described by reference to the first brake rotor disc 20a and the second brake rotor disc 20b, it will be appreciated that the following description also applies to the other adjacent pair of rotor discs 20a-20e, such as the second and third rotor discs 20b, 20c, the third and fourth rotor discs 20c, 20d, and the fourth and fifth rotor discs 20d, 20e.

In the various embodiments illustrated, the heat shield 34 includes a first heat shield 34a mounted to the first rotor disc 20a and a second heat shield 34b mounted to the second rotor disc 20b. In all illustrated embodiments, both the first heat shield 34a and the second heat shield 34b extend at least partially over and/or into the gap 32 defined between the radially outer portions 30 of adjacent rotor discs 20a, 20b. However, it is within the scope of the disclosure to provide a heat shield 34a, 34b on just one of the rotor discs 20. However, such an arrangement may not be as effective in preventing heat transfer to the wheel rim 8 and tyre 6.

In each of the embodiments described, the first and second heat shields 34a, 34b each comprise at least one axially extending fin 36a, 36b, 38a, 38b. The fin(s) 36a, 36b, 38a, 38b may have a curved profile that is substantially concentric with the rotor disc axis A-A.

Figure 2:
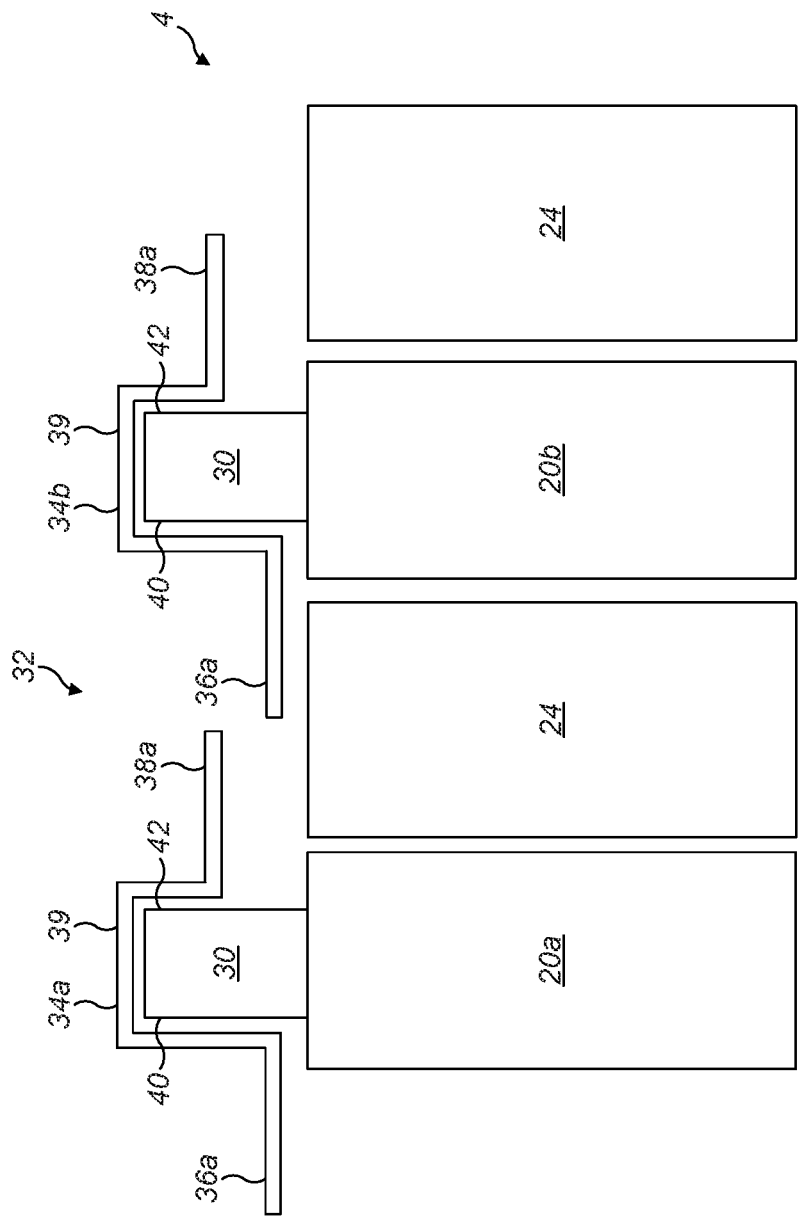
FIG. 2 shows, schematically, a first embodiment of a heat shield for a braking system, with the braking system in an unworn configuration.
Figure 3:
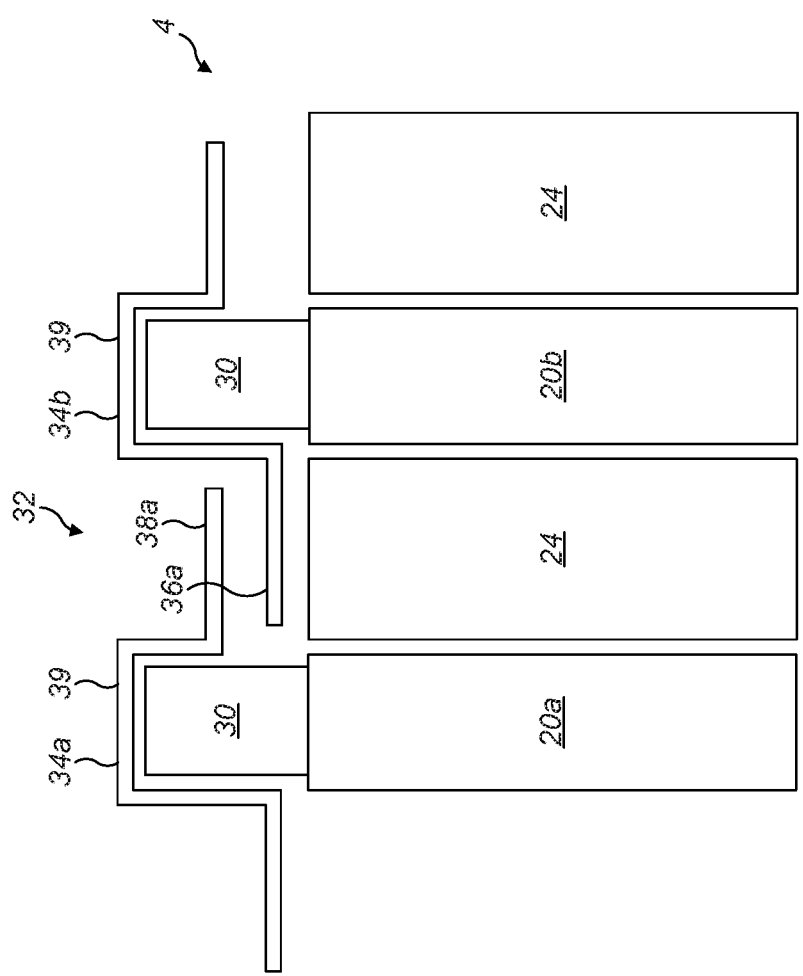
FIG. 3 shows, schematically, the first embodiment of a heat shield for a braking system, with the braking system in a worn configuration.

FIGS. 2 and 3 show a first embodiment of the heat shields 34a, 34b. In this embodiment, the first heat shield 34a has a base part 39 having the shape of an inverted U and fins 36a, 38a which extend axially outwardly from the inverted opposed sides of the base part 39. The base part 39 may extend over a portion of the outer periphery of the radially outer portion 30 of the rotor disc 20a, 20b. A first fin 36a therefore extends from a first side 40 of the radially outer portion 30 and a second fin 38b extends from an opposite second side 42 of the radially outer portion 30. The second heat shield 34b has generally the same fin arrangement as the first heat shield 34a. Like numbers indicate like parts. The second fin 38a of the first heat shield 34a and the first fin 36a of the second heat shield 34b extend towards each other into the gap 32.

The first and second heat shields 34a, 34b are configured and arranged such that they will not come into contact during use of the braking system 4 as the rotor and/or stator discs 20, 24 wear.

The respective fins 36a, 38a of the first and second heat shields 34a, 34b are arranged at different radial distances from the axis A-A such that the fins 36a, 38a are able to overlap axially during use of the braking system 4 as the rotor discs 20a, 20b and/or stator discs 24 wear.

FIG. 2 schematically illustrates the braking system 4 in an unworn configuration, where the rotor discs 20a, 20b and stator discs 24 have a maximum thickness. In this configuration, the first heat shield 34a and the second heat shield 34b extend into the gap 32 towards each other, but do not overlap or overlap to just a small degree.

During use of the braking system 4, the rotor discs 20a, 20b and/or stator discs 24 wear, causing the thickness of the rotor and/or stator discs to decrease. FIG. 3 shows the braking system of FIG. 2 in a worn configuration. In this configuration, the first heat shield 34a and the second heat shield 34b axially overlap or overlap to a greater degree.

Figure 4:
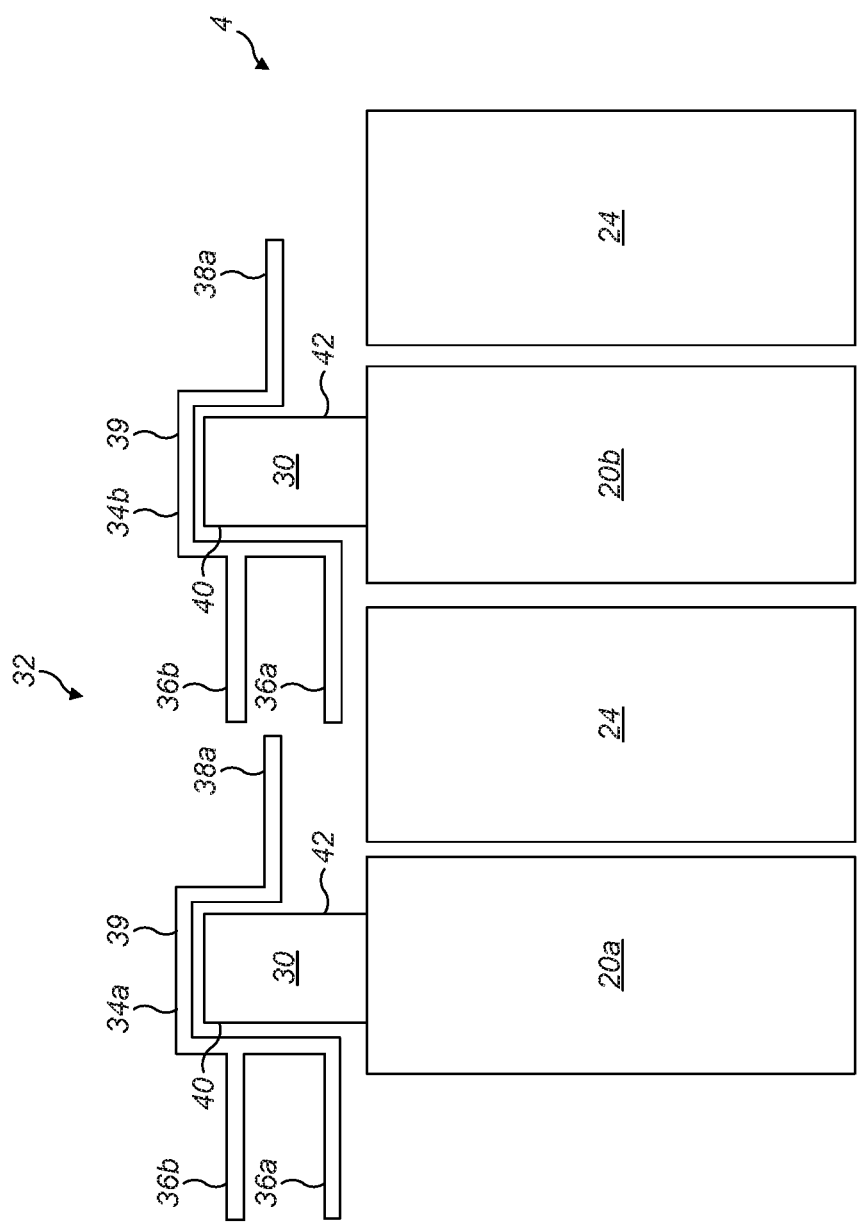
FIG. 4 shows, schematically, a second embodiment of a heat shield for a braking system, with the braking system in an unworn configuration.
Figure 5:
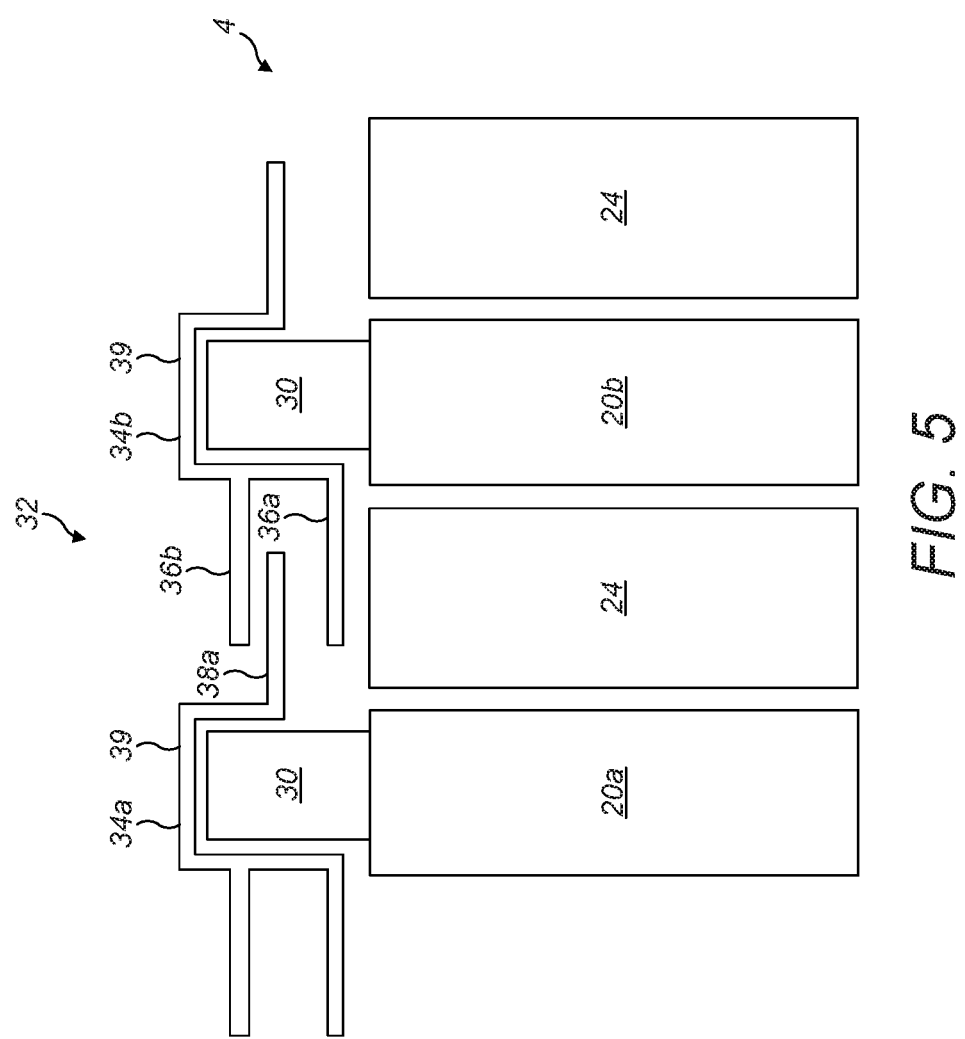
FIG. 5 shows, schematically, the second embodiment of a heat shield for a braking system, with the braking system in a worn configuration.

FIGS. 4 and 5 show a second embodiment of the heat shields 34a, 34b, which differs only from the embodiment of FIGS. 2 and 3 in the arrangement of fins. FIG. 4 shows the braking system 4 in an unworn configuration and FIG. 5 shows the braking system 4 in a worn configuration. In this embodiment, the first heat shield 34a has three axially extending fins 36a, 36b, 38a. Two first fins 36a, 36b extend from the first side 40 of the radially outer portion 30 and a second fin 38a extends from the opposite second side 42 of the radially outer portion 30. The second heat shield 34b has generally the same fin arrangement as the first heat shield 34a. Like numbers indicate like parts. The second fin 38a of the first heat shield 34a and the first fins 36a, 36b of the second heat shield 34b extend towards each other into the gap 32.

Figure 6:
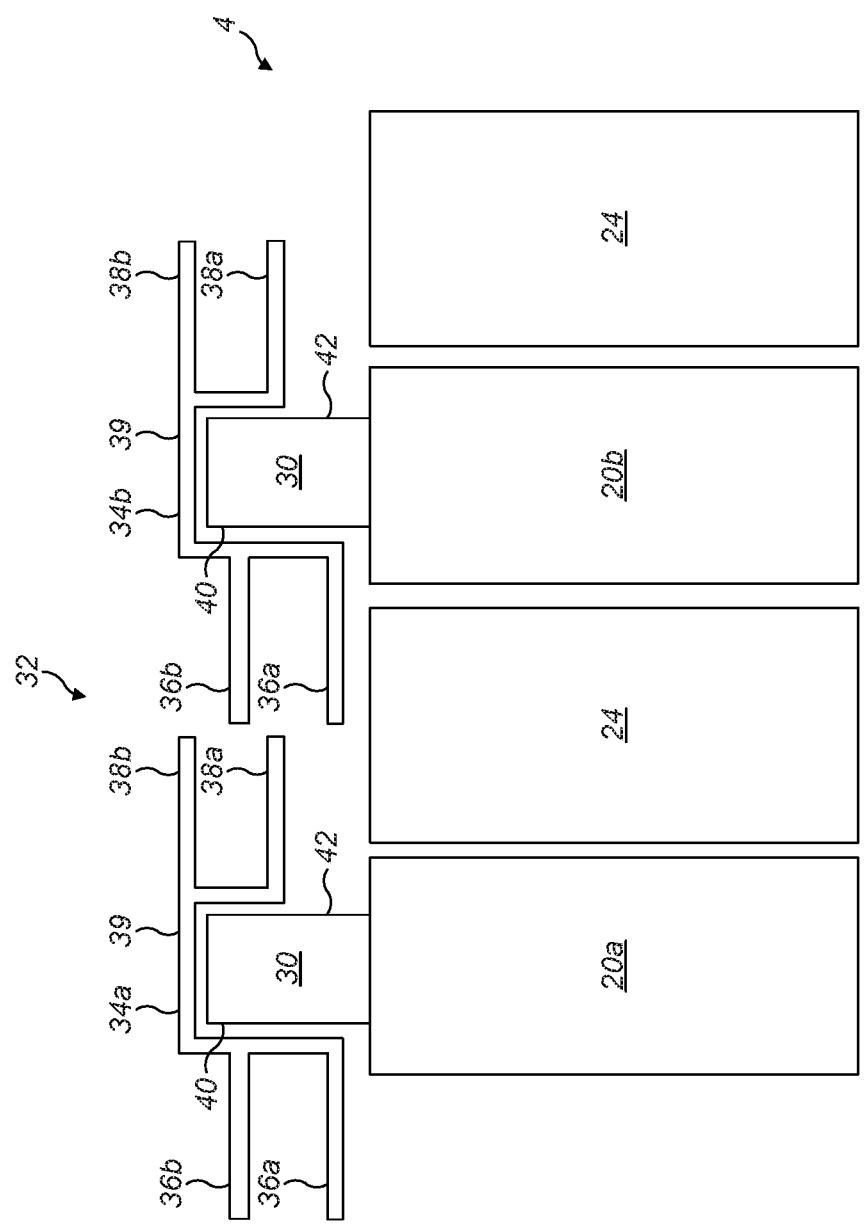
FIG. 6 shows, schematically, a third embodiment of a heat shield for a braking system, with the braking system in an unworn configuration.
Figure 7:
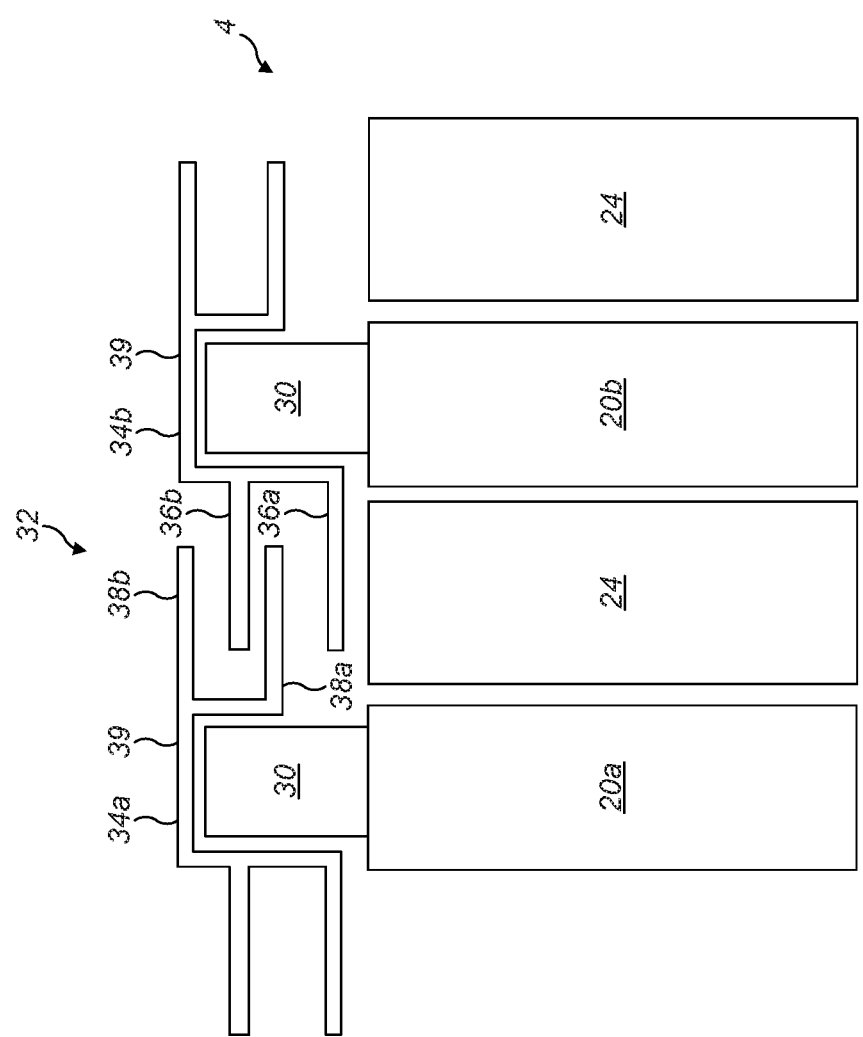
FIG. 7 shows, schematically, the third embodiment of a heat shield for a braking system, with the braking system in a worn configuration.

FIGS. 6 and 7 show a third embodiment of the heat shields 34a, 34b, which again differs only from the embodiment of FIGS. 2 and 3 in the arrangement of fins. FIG. 6 shows the braking system 4 in an unworn configuration and FIG. 7 shows the braking system 4 in a worn configuration. In this embodiment, the first heat shield 34a has four axially extending fins 36a, 36b, 38a, 38b. Two first fins 36a, 36b extend from the first side 40 of the radially outer portion 30 and two second fins 38a, 38b extend from the opposite second side 42 of the radially outer portion 30. The second heat shield 34b has generally the same fin arrangement as the first heat shield 34a. Like numbers indicate like parts. The second fins 38a, 38b of the first heat shield 34a and the first fins 36a, 36b of the second heat shield 34b extend towards each other into and/or over the gap 32.

In the illustrated embodiment, the two first fins 36a, 36b extend into the gap. The radially inner second fin 38a also extends into the gap. The radially outer second fin 38b extends over the gap 32. In other embodiments, all of the fins 36a, 36b, 38a, 38b may extend into the gap 32.

Figure 8:
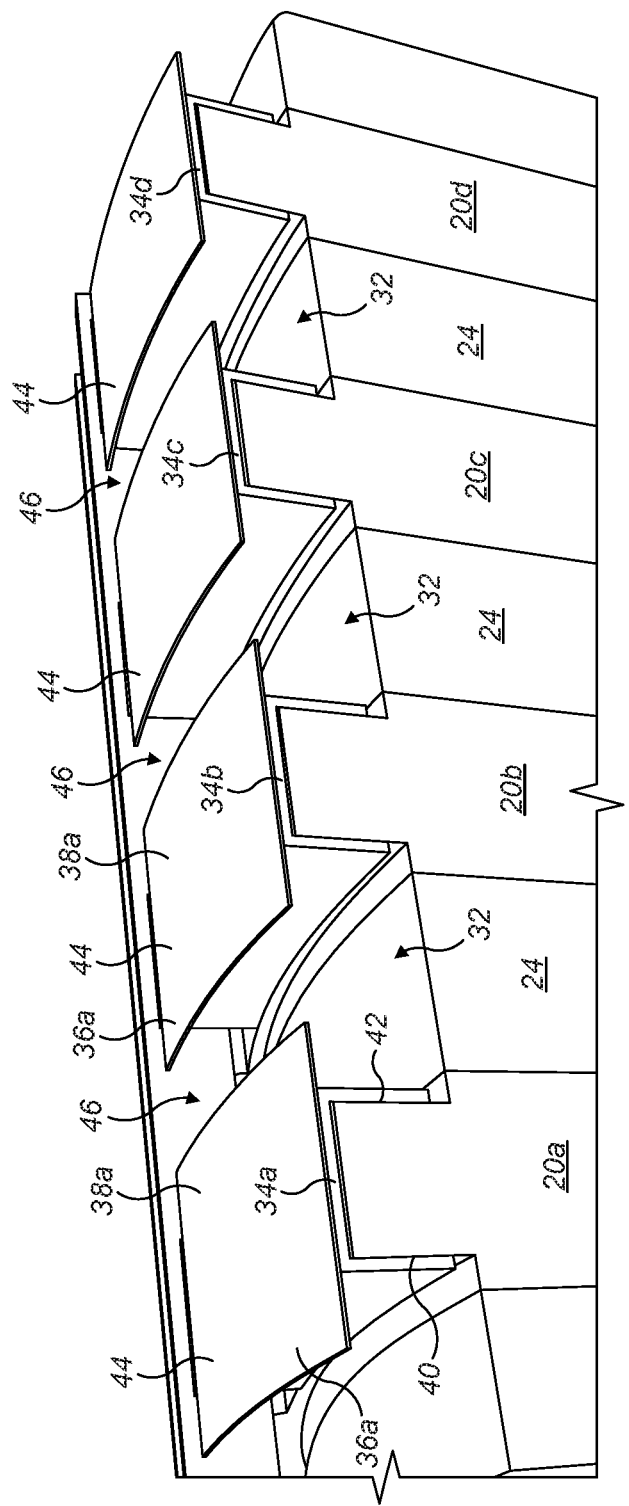
FIG. 8 shows, schematically, a fourth embodiment of a heat shield for a braking system, with the braking system in an unworn configuration.
Figure 9:
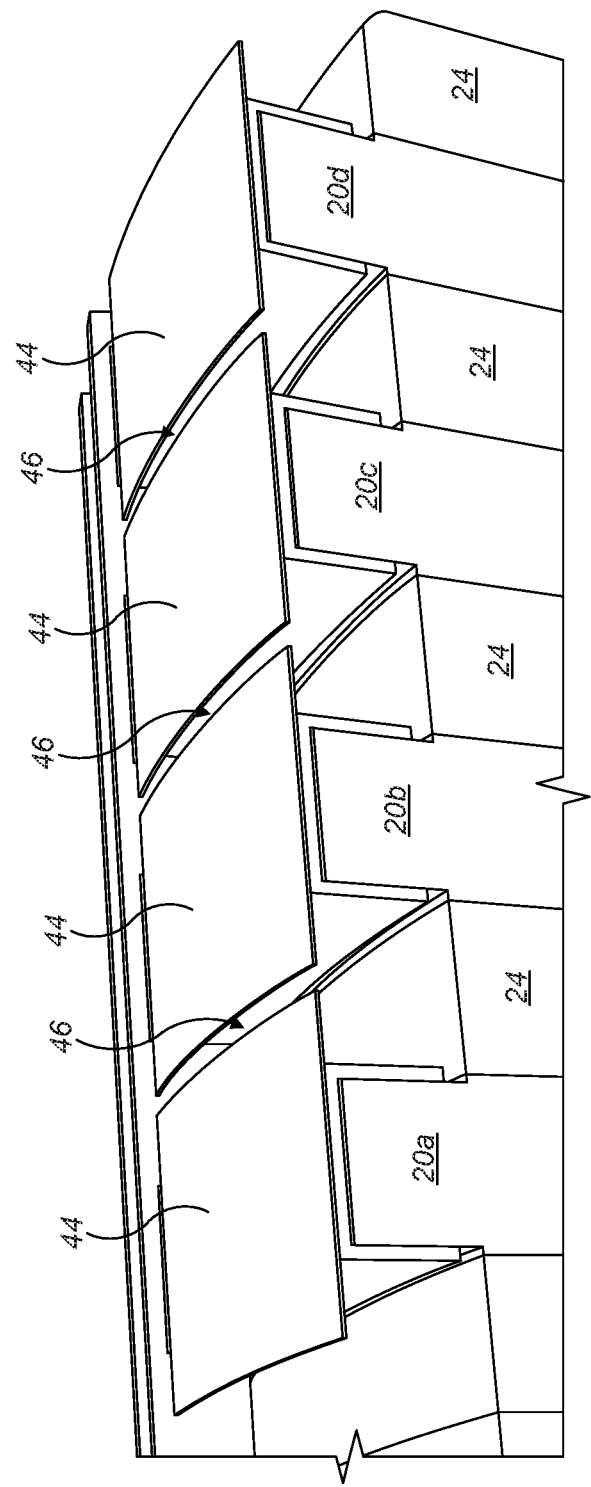
FIG. 9 shows, schematically, the fourth embodiment of a heat shield for a braking system, with the braking system in a worn configuration.

FIGS. 8 and 9 show a fourth embodiment of the disclosure. This embodiment differs from the embodiment of FIGS. 2 and 3 in the arrangement of fins and in that the fins do not overlap in the worn configuration. FIG. 8 shows the braking system 4 in an unworn configuration and FIG. 9 shows the braking system 4 in a worn configuration.

This embodiment is illustrated on a braking system 4 having four rotor discs 20a, 20b, 20c, 20d. In this embodiment, the first fin 36a and the second fin 38a project axially from opposed sides of the rotor disc and are arranged at substantially the same radial distance from the wheel axis A-A. However, they have an axial length such that the fins 36a, 38b will not contact each other during use of the braking system 4 as the rotor discs 20a-20d and stator discs 20 wear, as illustrated in FIG. 9.

In the embodiment shown, the first fin 36a and the second fin 38a are formed as a single axially extending fin 44 positioned radially outwardly of the radially outer portion 30. The fin 44 extends axially from a first side 40 and a second side 42 of the radially outer portion 30. The second, third and fourth heat shields 34b, 34c, 34d also have a single axially extending fin 44. Like numbers indicate like parts. The fins 44 of adjacent heat shields 34a, 34b, 34c, 34d extend towards each other over gaps 32.

Referring to FIG. 8, in the unworn configuration, there is a gap 46 between fins 44 of adjacent heat shields 34a, 34b, 34c, 34d. Referring to FIG. 9, in the worn configuration, the gap 46 between fins 44 of adjacent heat shields 34a, 34b, 34c, 34d is smaller than in the unworn configuration, but the fins 44 do not contact each other.

This embodiment may advantageously be simpler to manufacture than the overlapping embodiments described above, although potentially it may not be as effective thermally.

In all of the above embodiments, the second heat shield 34b has the same fin arrangement as the first heat shield 34a. In alternative embodiments, the second heat shield 34b may have a different fin arrangement to the first heat shield 34a.

In some embodiments (not illustrated), the first and/or second heat shield 34a, 34b may have just one axially extending fin extending from one side of the radially outer portion and no fins extending from the opposite side of the radially outer portion. In other embodiments, the first and/or second heat shield 34a, 34b may have a plurality of axially extending fins extending from the same side of the radially outer portion and no fins extending from the opposite side of the radially outer portion.

Figure 10:
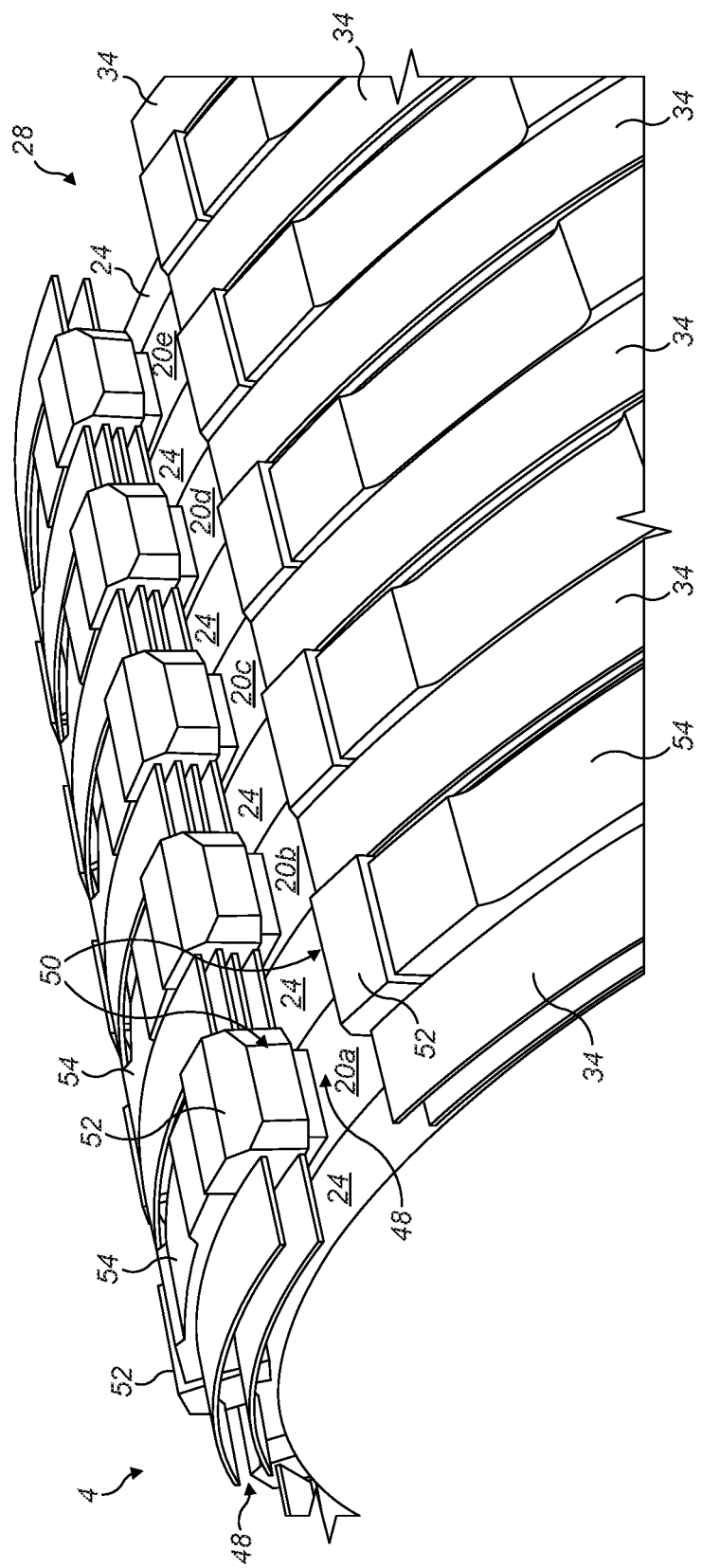
FIG. 10 shows a perspective view of an exemplary braking system utilising the third embodiment heat shield.

FIG. 10 shows a perspective view of a further exemplary braking system 4. The braking system 4 employs a heat shield configuration as illustrated in FIGS. 6 and 7 mounted to a plurality of rotor discs 20a, 20b, 20c, 20d, 20e in a brake disc stack 28. The brake disc stack 28 is shown in the braked position in a worn configuration.

Referring to FIG. 10, the radially outer portions 30 of the rotor discs each comprise a plurality of axially extending slots 48. The slots 48 are adapted to receive torque bars 22 (FIG. 1) for rotationally coupling the rotor discs 20a-20e to the wheel 2. The circumferential side surfaces 50 of the slots 48 receive rotor clips 52 mounted to the rotor discs 20a-20e and adapted to protect the side surfaces 50 of the slots 48. The heat shields 34a, 34b, 34c, 34d are mounted to or integrally formed with the rotor clips 52.

The slots 48 divide the radially outer portion 30 of a rotor disc 20a-20e into a plurality of peripheral circumferential sections 54. In the embodiment shown, each section 54 has a rotor clip 52 at either end, and the heat shields 34 are mounted to and extend between the rotor clips 52 for substantially the entire length of the section 54. The heat shields 34 may be mounted to or integrally formed with the rotor clips 52 at either or both ends of a given section 54. In an alternative embodiment, a single rotor clip may extend along the length of a circumferential section 54 and the heat shields 34 are mounted to or integrally formed with the single rotor clip.

FIG. 10 illustrates a plurality of identical rotor clips 52 installed on each circumferential section 54 of the radially outer portions 30 of the rotor discs 20a-20e.

Figure 11:
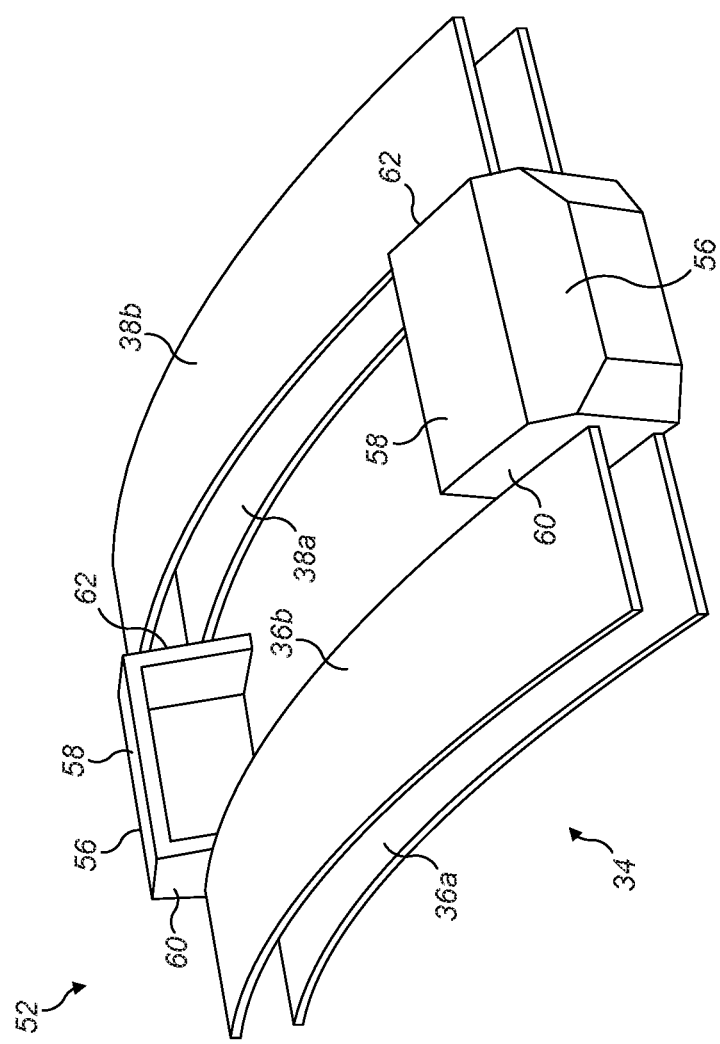
FIG. 11 shows a perspective view of a rotor clip for use with the braking system of FIG. 10.

FIG. 11 shows a detailed view of the rotor clips 52. The rotor clips 52 are formed from a pair of bodies 56 adapted to protect the side surfaces 50 of the slots 48 and a heat shield 34 extending between the bodies 56. It will be appreciated that a single body 56 may also be used. Each body 56 is adapted to mount to a radially outer portion 30 of a brake rotor disc 20a-20e. For example, the clip 52 may be riveted to the rotor disc 20. Each body 56 has a base 58 and first and second sides 60, 62 extending substantially parallel to each other from opposite ends of the base 58. A heat shield 34 integrally formed with the bodies 56. Alternatively, the heat shield 34 may be mounted to the bodies 56. In the embodiment shown, the heat shield 34 does not have a separate base part as in the earlier embodiment. It will be appreciated however that the heat shield 34 could have a base part that is integrally formed with the bases 58 of the bodies 56, or that the base part and the base 58 could alternatively be separate parts.

Although illustrated with a heat shield configuration as shown in FIGS. 6 and 7, the embodiment of FIGS. 10 and 11 may alternatively utilise heat shield configurations as shown in relation to the other embodiments, or as described herein.

Figure 12:
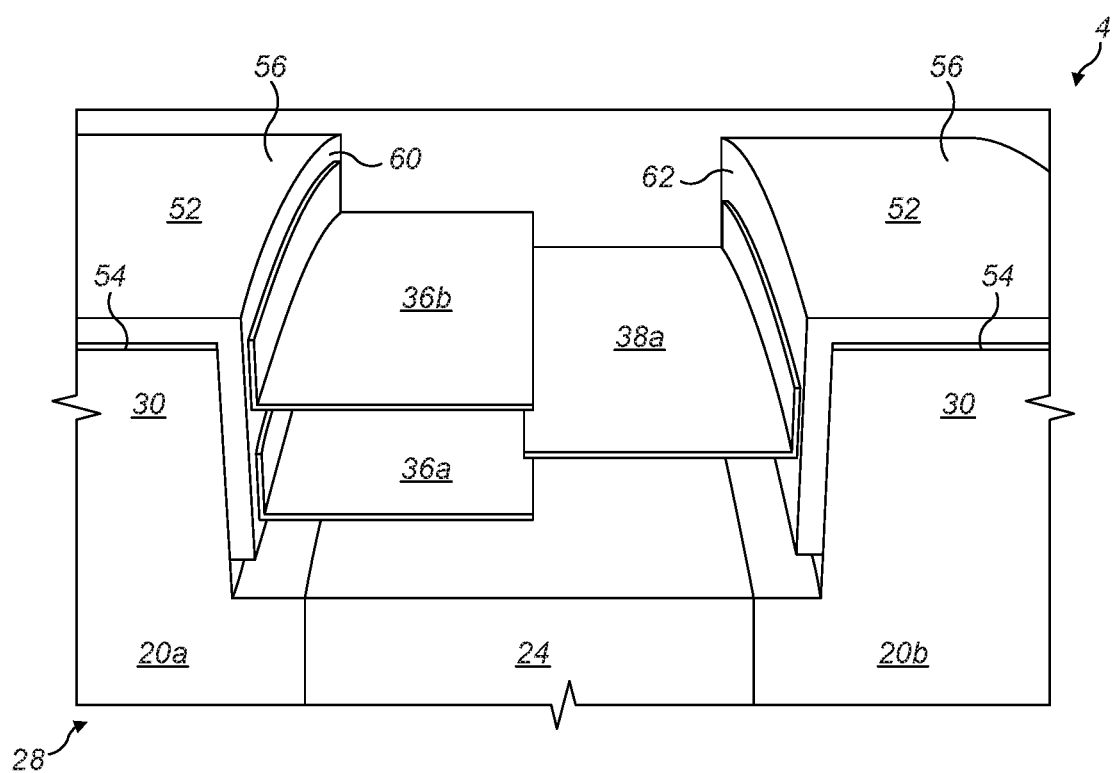
FIG. 12 shows a perspective view of another exemplary braking system utilising the second embodiment heat shield, with the braking system in an unworn configuration.
Figure 13:
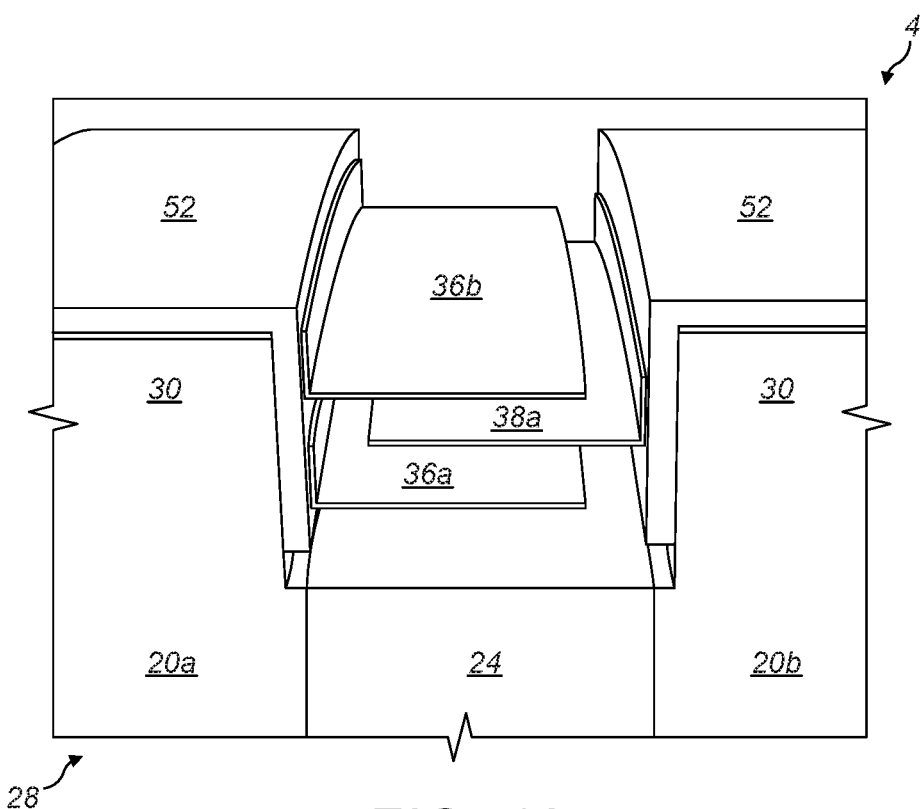
FIG. 13 shows a perspective view the braking system of FIG. 12, with the braking system in a worn configuration.

For example, FIGS. 12 and 13 show a braking system 4 with rotor clips 52 having a heat shield configuration as illustrated in FIGS. 4 and 5. FIG. 12 shows the brake disc stack 28 in the braked position in an unworn configuration. FIG. 13 shows the brake disc stack 28 in the braked position in a worn configuration. A single rotor clip 52 having a single rotor clip body 56 extends along the length of a circumferential section 54 of the radially outer portions 30. The heat shield fins 36a, 36b, 38a are separate parts that are mounted to the first and second sides 60, 62 of the body 56. The features and functionality of the braking system 4 of FIGS. 12 and 13 are otherwise the same as for the braking system 4 described above with reference to FIGS. 10 and 11.

The rotor clip 52 may be formed from any suitable materials. The rotor clip body may be formed from a conventional rotor clip material, such as steel. The heat shield 34 may be formed from the same material as the body, or a different material with suitable thermal properties.

Any suitable manufacturing process may be used to form the rotor clip 52 and heat shield 34. The heat shield 34 may be integrally formed with the rotor clip body 56, for example by sheet metal forming. Alternatively, the heat shield 34 may be manufactured as a separate part and connected to the body 56 using any suitable process such as riveting, brazing, or welding. The heat shield fins 36a, 36b, 38a, 38b may also be manufactured as separate parts and mounted to the base part 39 of the heat shield 34 and/or the body 56 of the rotor clip 52 using any suitable process such as riveting, brazing, or welding.

While using a rotor clip 52 is a convenient way of mounting the heat shield to the rotor discs 20, other mechanisms may be used. For example the heat shields may be directly mounted to axially facing surfaces of the rotors or be mounted to saddles which extends over the radially outer portions 30 of the rotor discs 20.

Experimental Data

By providing heat shields as described in the embodiments above, heat transfer to the wheel 2 and the tyre 6 may be reduced.

Simulations were performed to compare the thermal performance of the embodiment illustrated in FIG. 10 with a baseline model. The baseline model represented a conventional braking system, and included rotor clips (but no heat shields 34). For the disclosure model, the density of the clips 52 with heat shields 34 was decreased so the disclosure model and the baseline model had similar mass. This removed any temperature decreases associated with increased mass from the analysis and allowed a direct comparison of the effect of the geometry of the disclosure model on thermal performance compared with the baseline model.

Figure 14:
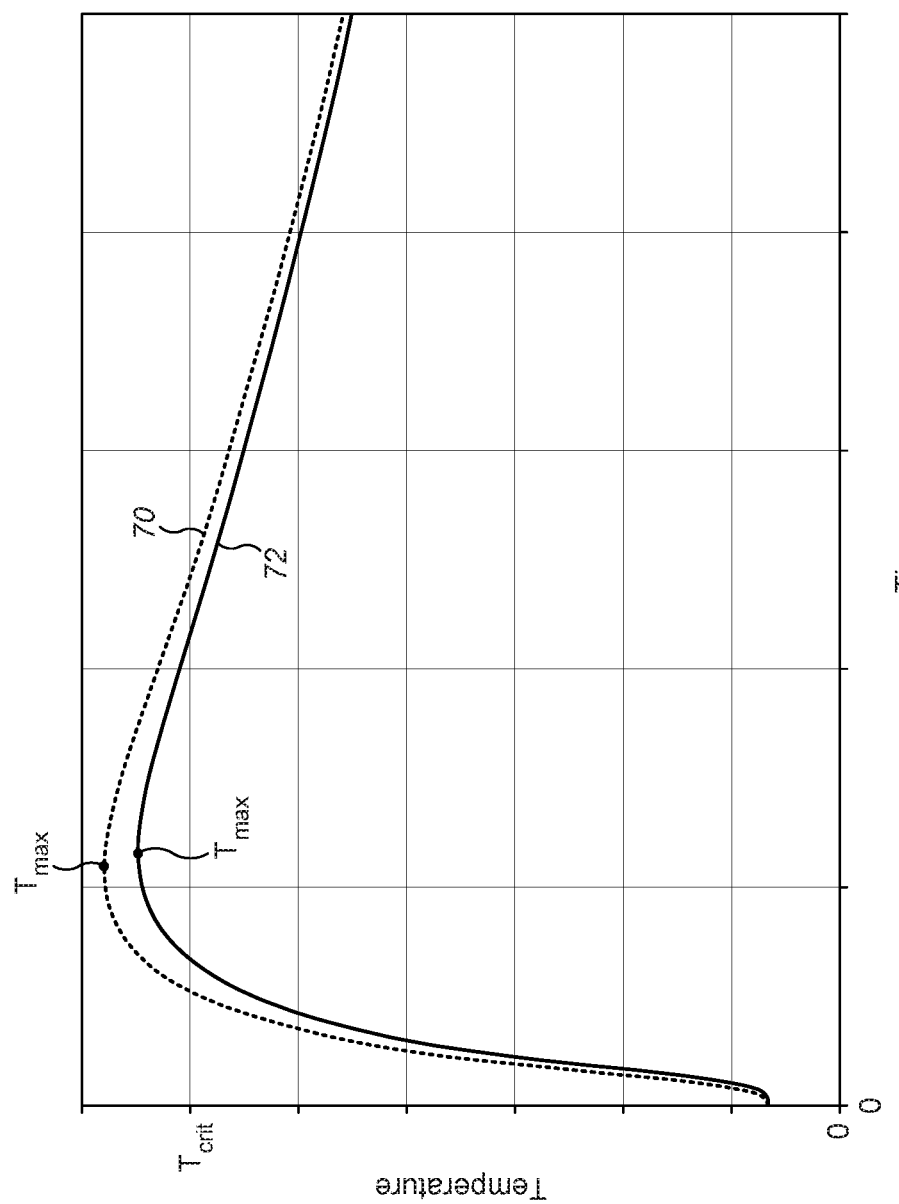
FIG. 14 shows the results of high energy stop simulation for the embodiment of FIG. 10.

FIG. 14 shows the results of a high energy stop simulation. In this simulation a single high energy stop was simulated to represent braking during a high energy stop. FIG. 12 shows the temperature of the wheel rim 8 at point B (shown on FIG. 1) during the simulation. The high energy stop standard requires the temperature at point B to remain below a critical temperature (Tcrit) for a specified period of time. It is therefore advantageous for the braking system 4 to take as long as possible to reach this temperature during braking simulation.

Line 70 on FIG. 14 shows the thermal performance of the baseline model and line 72 shows the thermal performance of the disclosure model. It can be seen that the disclosure model has a lower maximum temperature (Tmax) and also takes longer to reach the maximum temperature (Tmax) compared with the baseline model. The disclosure model also takes longer to reach Tcrit. Therefore, the invention model has improved thermal performance compared with the baseline model in the high energy stop simulation.

It will be appreciated that the above embodiments are exemplary only and that modifications thereto may be made within the scope of the disclosure.

What is claimed is:

1. A braking system (4) for an aircraft wheel (2), comprising:
   first and second brake rotor discs (20a, 20b) axially spaced along an axis (A) and rotationally coupled to the wheel (2);
   a stator disc (24) arranged axially between the first and second brake rotor discs (20a, 20b), wherein radially outer portions (30) of the first and second brake rotor discs (20a, 20b) extend radially outwardly of the stator disc (24) to define a gap (32) between the radially outer portions (30) of the first and second brake rotor discs (20a, 20b), wherein the gap (32) is disposed axially between the first brake rotor disc (20a) and the second brake rotor disc (20b);
   a first heat shield (34a) mounted to the first brake rotor disc (20a) and extending at least partially over or into the gap (32); and
   a second heat shield (34b) mounted to the second brake rotor disc (20b) and extending at least partially over or into the gap (32);
   wherein the first heat shield (34a) comprises at least one axially extending fin (36a, 36b, 38a, 38b);
   wherein the second heat shield (34b) comprises at least one axially extending fin (36a, 36b, 38a, 38b); and wherein respective first and second fins (36, 38) of the first and second heat shields (20a, 20b) are arranged at different radial distances from the axis such that the first and second fins (36, 38) may overlap axially during use of the braking system as the first and second brake rotor discs (20a, 20b) and the stator disc (24) wear.

2. The braking system of claim 1, wherein the at least one axially extending fin (36, 38) of the first or second heat shield has a curved profile that is substantially concentric with the rotor disc axis (A).

3. The braking system of claim 1, wherein the first and second heat shields (34a, 34b) are configured and arranged such that they will not come into contact during use of the braking system as the first and second brake rotor discs (20a, 20b) and/or the stator disc (24) wear.

4. The braking system of claim 1, wherein the radially outer portions (30) of the first and second brake rotor discs (20a, 20b) each comprise a plurality of axially extending slots (48), the slots (48) adapted to receive torque bars (22) for coupling the first and second brake rotor discs (20a, 20b) to the wheel (2), wherein circumferential side surfaces (50) of the slots (48) receive rotor clips (52) mounted to the first and second brake rotor discs (20a, 20b) and adapted to protect the circumferential side surfaces (50) of the slots (48), and wherein the first and second heat shield (34a, 34b) are mounted to or integrally formed with the rotor clips (52).

5. The braking system of claim 4, wherein each rotor clip (52) comprises a body (56) adapted to mount to a radially outer portion (30) of the first and/or second brake rotor disc (20a, 20b), the body (56) having a base (58) and first and second sides (60, 62) extending substantially parallel to each other from opposite ends of the base (58), and
wherein the heat shield (34a, 34b) is mounted to or integrally formed with the body (56), the heat shield comprising at least one first fin (36, 38) extending substantially orthogonally from the first side (60) of the body (56).

6. The braking system of claim 5, wherein the rotor clip (52) comprises a plurality of first fins (36a) extending from the first side (60) of the body (58).

7. The braking system of claim 6, wherein at least one of the first fin(s) (36a) and the second fin(s) (38b) are arranged at different distances from the base (58) or the first fin (36a) and the second fin (38b) are arranged at substantially the same distance from the base (58).

8. The braking system of claim 5, further comprising at least one second fin (38a), the at least one second fin (38a) extending substantially orthogonally from the second side (62) of the body (58) and extending in an opposite direction to the at least one first fin (38a).

9. The braking system of claim 5, further comprising a plurality of second fins (38a) extending substantially orthogonally from the second side (62) of the body (58).

10. The braking system of claim 1, wherein the first heat shield (34a) comprises a plurality of axially extending fins (36a, 36b, 38a, 38b), the plurality of axially extending fins includes the at least one axially extending fin (36a, 36b, 38a, 38b).

11. The braking system of claim 1, wherein the second heat shield (34b) comprises a plurality of axially extending fins (36a, 36b, 38a, 38b), the plurality of axially extending fins includes the at least one axially extending fin (36a, 36b, 38a, 38b).

12. A braking system (4) for an aircraft wheel (2), comprising:
a first brake rotor disc (20a) rotationally coupled to the aircraft wheel (2);
a second brake rotor disc (20b) axially spaced from the first brake rotor disc (20a) along an axis (A) and rotationally coupled to the aircraft wheel (2);
a stator disc (24) arranged axially between the first brake rotor disc (20a) and the second brake rotor disc (20b), wherein radially outer portions (30) of the first and second brake rotor discs (20a, 20b) extend radially outwardly of the stator disc (24) to define a gap (32) between the radially outer portions (30) of the first and second brake rotor discs (20a, 20b), wherein the gap (32) is disposed axially between the first brake rotor disc (20a) and the second brake rotor disc (20b); and
a first heat shield (34a) mounted to the first brake rotor disc (20a) and extending at least partially over or into the gap (32); and
a second heat shield (34b) mounted to the second brake rotor disc (20b) and extending at least partially over or into the gap (32);
wherein the first heat shield (34a) comprises at least one axially extending fin (36a, 36b, 38a, 38b);
wherein the radially outer portions (30) of the first and second brake rotor discs (20a, 20b) each comprise a plurality of axially extending slots (48), the slots (48) adapted to receive torque bars (22) for coupling the first and second brake rotor discs (20a, 20b) to the aircraft wheel (2), wherein circumferential side surfaces (50) of the slots (48) receive rotor clips (52) mounted to the first and second brake rotor discs (20a, 20b) and adapted to protect the circumferential side surfaces (50) of the slots (48), and wherein the first and second heat shields (34a, 34b) are mounted to or integrally formed with the rotor clips (52);
wherein each rotor clip (52) comprises a body (56) adapted to mount to a radially outer portion (30) of the first brake rotor disc (20a) or the second brake rotor disc (20b), the body (56) having a base (58), a first side (60) and a second side (62), the first side (60) and the second side (62) extending substantially parallel to each other from opposite ends of the base (58); and
wherein the first and second heat shields (34a, 34b) are mounted to or integrally formed with the body (56), the first and second heat shields each comprising at least one first fin (36, 38) extending substantially orthogonally from the first side (60) of the body (56).

* * * * *